(12) United States Patent
Naito et al.

(10) Patent No.: US 12,247,558 B2
(45) Date of Patent: Mar. 11, 2025

(54) ELECTRIC COMPRESSOR

(71) Applicant: KABUSHIKI KAISHA TOYOTA JIDOSHOKKI, Aichi-ken (JP)

(72) Inventors: Atsushi Naito, Aichi-ken (JP); Keiji Yashiro, Aichi-ken (JP); Kazuhiro Shiraishi, Aichi-ken (JP); Yusuke Kinoshita, Aichi-ken (JP)

(73) Assignee: KABUSHIKI KAISHA TOYOTA JIDOSHOKKI, Aichi-Ken (JP)

( * ) Notice: Subject to any disclaimer, the term of this patent is extended or adjusted under 35 U.S.C. 154(b) by 767 days.

(21) Appl. No.: 17/157,445

(22) Filed: Jan. 25, 2021

(65) Prior Publication Data
US 2021/0231115 A1 Jul. 29, 2021

(30) Foreign Application Priority Data
Jan. 29, 2020 (JP) ................................ 2020-012575

(51) Int. Cl.
*F04B 39/12* (2006.01)
*F04B 35/04* (2006.01)
(Continued)

(52) U.S. Cl.
CPC ............ *F04B 39/121* (2013.01); *F04B 35/04* (2013.01); *F04C 18/0215* (2013.01);
(Continued)

(58) Field of Classification Search
CPC ........ F04B 39/121; F04B 35/04; F04B 39/06; F04B 37/12; F04B 39/00; F04C 18/0215;
(Continued)

(56) References Cited

U.S. PATENT DOCUMENTS

| 7,955,141 | B2* | 6/2011 | Jang | ....................... H01R 11/09 439/709 |
| 2004/0109772 | A1* | 6/2004 | Ogawa | ................... F01C 21/10 418/55.6 |

(Continued)

FOREIGN PATENT DOCUMENTS

| DE | 102012216949 A1 | 3/2014 | |
| JP | 2015-48800 | 3/2015 | |
| JP | 2020165324 A | * 10/2020 | .............. F04B 35/04 |

OTHER PUBLICATIONS

Raw Machine Translation of JP2020165324A, Kinoshita et al.; Motor Compressor, Oct. 2020.*

*Primary Examiner* — Charles G Freay
*Assistant Examiner* — Lilya Pekarskaya
(74) *Attorney, Agent, or Firm* — Greenblum & Bernstein, P.L.C.

(57) ABSTRACT

An electric compressor including a rotary shaft, a compression part, an electric motor, an inverter circuit, a filter element disposed on an input side of the inverter circuit, the filter element including a capacitor connected in parallel to a direct current power source, a holder holding the filter element, a resistor having a lead portion electrically connected to the capacitor, and a housing having an inverter accommodation chamber in which the inverter circuit, the holder, and the capacitor are accommodated. The holder includes a metal plate having an internally threaded screw hole. The resistor is held by the holder with the metal plate interposed therebetween with a bolt screwed into the internal threaded screw hole. The holder is fixed to the housing. The holder is interposed between the lead portion and the housing. An insulating heat transfer member is interposed between the metal plate and the housing.

2 Claims, 4 Drawing Sheets

(51) Int. Cl.
  *F04C 18/02* (2006.01)
  *F04D 25/06* (2006.01)
  *H02K 11/33* (2016.01)

(52) U.S. Cl.
  CPC ......... *F04D 25/0693* (2013.01); *H02K 11/33* (2016.01); *F04C 2240/808* (2013.01)

(58) Field of Classification Search
  CPC .......... F04C 2240/808; F04C 2240/803; F04D 25/0693; F04D 25/068; H02K 11/33; H02K 11/0094
  See application file for complete search history.

(56) References Cited

U.S. PATENT DOCUMENTS

| | | | | |
|---|---|---|---|---|
| 2005/0011213 | A1* | 1/2005 | Shindo | F04C 23/008 62/259.2 |
| 2012/0237376 | A1* | 9/2012 | Kinoshita | F04B 39/121 417/423.7 |
| 2014/0294624 | A1* | 10/2014 | Suitou | F04C 15/0096 417/410.1 |
| 2015/0061421 | A1* | 3/2015 | Yano | H02K 11/05 310/52 |

* cited by examiner

ELECTRIC COMPRESSOR

CROSS-REFERENCE TO RELATED APPLICATION

This application claims priority to Japanese Patent Application No. 2020-012575 filed on Jan. 29, 2020, the entire disclosure of which is incorporated herein by reference.

BACKGROUND ART

The present disclosure relates to an electric compressor.

An electric compressor includes a rotary shaft, a compression part that compresses fluid with a rotation of the rotary shaft, an electric motor that rotates the rotary shaft, and an inverter circuit that drives the electric motor. The electric compressor further includes a filter element including a capacitor that is disposed on an input side of the inverter circuit and connected in parallel to a direct power source. The electric compressor includes a metal housing having an inverter accommodation chamber in which the inverter circuit and the filter element are accommodated.

For example, in an electric compressor disclosed in Japanese Patent Application Publication No. 2015-48800, a filter element is held by a holder made of a resin. The holder is mounted to a housing with a bolt in a state where the holder is disposed in the inverter accommodation chamber, so that the filter element is accommodated in the inverter accommodation chamber.

In some case, the electric compressor includes a resistor electrically connected to a capacitor. For the resistor mounted to the electric compressor, a high allowable power dissipation may be required. Since the allowable power dissipation is proportional to the size of the resistor, the size of the resistor with high allowable power dissipation becomes large. It is difficult to mount a large resistor to a substrate. Therefore, the resistor may be accommodated in the inverter accommodation chamber together with an inverter circuit and the filter element by being mounted directly to the housing in the state where the resistor is disposed in the inverter accommodation chamber. In this case, an insulating member for securing a creepage distance between a lead portion of the resistor and the housing need to be provided in order to secure the insulation between the lead portion of the resistor and the housing, which may increase the size of the electric compressor. Additionally, heat generated from the large resistor needs to be dissipated efficiently.

The present disclosure is directed to providing an electric compressor that releases heat generated from a resistor efficiently without making the size of the electric compressor large.

SUMMARY

In accordance with an aspect of the present disclosure, there is provided an electric compressor including a rotary shaft, a compression part configured to compress fluid with a rotation of the rotary shaft, an electric motor configured to rotate the rotary shaft, an inverter circuit configured to drive the electric motor, a filter element disposed on an input side of the inverter circuit, the filter element including a capacitor connected in parallel to a direct current power source, a holder made of a resin and holding the filter element, a resistor having a lead portion electrically connected to the capacitor, and a housing made of a metal and having an inverter accommodation chamber in which the inverter circuit, the holder, and the capacitor are accommodated. The holder includes a metal plate having an internally threaded screw hole. The resistor is held by the holder with the metal plate interposed between the resistor and the holder with a bolt screwed into the internal threaded screw hole. The holder is fixed to the housing. The holder is interposed between the lead portion and the housing. An insulating heat transfer member is interposed between the metal plate and the housing.

Other aspects and advantages of the present disclosure will become apparent from the following description, taken in conjunction with the accompanying drawings, illustrating by way of example the principles of the present disclosure.

BRIEF DESCRIPTION OF THE DRAWINGS

The present disclosure together with objects and advantages thereof may best be understood by reference to the following description of the presently preferred embodiments together with the accompanying drawings in which.

DETAILED DESCRIPTION OF THE EMBODIMENTS

Figure 1:
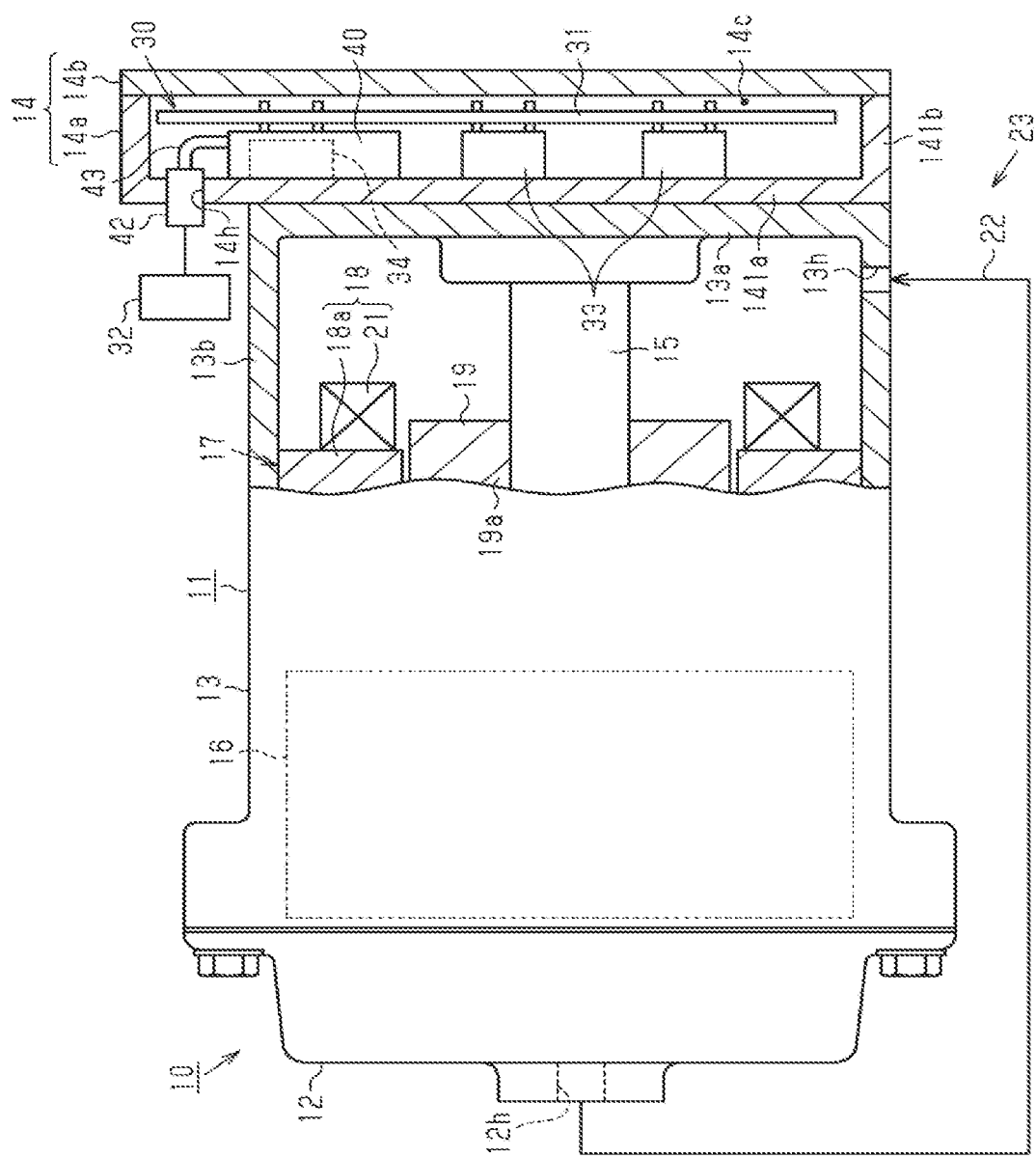
FIG. 1 is a side sectional view of an electric compressor according to an embodiment of the present disclosure in which a part of the electric compressor is illustrated in cross section.

The following will describe an embodiment of the present disclosure with reference to FIGS. 1 to 6. An electric compressor of the present embodiment is used for a vehicle air-conditioner, for example. As illustrated in FIG. 1, an electric compressor 10 includes a housing 11 made of a metal having a tubular shape. The housing 11 includes a discharge housing 12 having a bottomed tubular shape, a motor housing 13 having a bottomed tubular shape, connected to the discharge housing 12, and an inverter case 14 connected to the motor housing 13. The discharge housing 12, the motor housing 13; and the inverter case 14 are made of, for example, aluminum. The motor housing 13 includes a bottom wall 13a having a plate shape and a peripheral wall 13b extending in a tubular shape from an outer periphery of the bottom wall 13a. An inlet port 13h through which a refrigerant as fluid is drawn into the motor housing 13 is formed in the peripheral wall 13b of the motor housing 13.

A rotary shaft 15 is accommodated in the motor housing 13. The rotary shaft 15 is accommodated in the motor housing 13 in a state where the axis of the rotary shaft 15 coincides with the axis of the peripheral wall 13b of the motor housing 13. The motor housing 13 accommodates a compression part 16 compressing refrigerant driven by a rotation of the rotary shaft 15, and an electric motor 17 rotating the rotary shaft 15 to drive the compression part 16. Thus, the housing 11 accommodates the compression part 16 and the electric motor 17. The compression part 16 and the electric motor 17 are arranged side by side in a direction in which the axis of the rotary shaft 15 extends. The electric motor 17 is disposed closer to the bottom wall 13a of the motor housing 13 than the compression part 16 is.

The compression part 16 is, for example, a scroll type compression part including a fixed scroll (not illustrated) fixed in the motor housing 13 and a movable scroll (not illustrated) disposed facing the fixed scroll.

The electric motor 17 includes a stator 18 having a tubular shape and a rotor 19 disposed inward of the stator 18. The rotor 19 rotates integrally with the rotary shaft 15. The stator 18 surrounds the rotor 19. The rotor 19 includes a rotor core 19a fixedly mounted on the rotary shaft 15 and a plurality of permanent magnets (not illustrated) provided in the rotor core 19a The stator 18 includes a stator core 18a having a tubular shape and a motor coil 21 wounded around the stator core 18a.

One end of an external refrigeration circuit 22 is connected to the inlet port 13h. A discharge port 12h is formed in the discharge housing 12. The other end of the external refrigeration circuit 22 is connected to the discharge port 12h. Refrigerant drawn into the motor housing 13 through the inlet port 13h from the external refrigeration circuit 22 is compressed with operation of the compression part 16, and flows out therefrom to the external refrigeration circuit 22 through the discharge port 12h. The refrigerant flowing out to the external refrigeration circuit 22 passes through a heat exchanger and an expansion valve (neither shown) of the external refrigeration circuit 22 and is recirculated into the motor housing 13 through the inlet port 13h. The electric compressor 10 and the external refrigeration circuit 22 form a vehicle air-conditioner 23.

The inverter case 14 includes a case body 14a having a bottomed tubular shape and a cover 14b closing an opening of the case body 14a. The case body 14a includes a bottom wall 141a having a plate shape and a peripheral wall 141b extending in a tubular shape from an outer periphery of the bottom wall 141a. An inverter accommodation chamber 14c is formed by an inner surface of the case body 14a and an inner surface of the cover 14b in the inverter case 14.

The inverter case 14 is mounted to the motor housing 13 with the bottom wall 141a of the case body 14a connected to the bottom wall 13a of the motor housing 13. The area of the bottom wall 141a is greater than that of the bottom wall 13a of the motor housing 13. Thus, a portion of the bottom wall 141a projects outwardly of an edge of the bottom wall 13a of the motor housing 13. A connector insertion hole 14h extending through the bottom wall 141a is formed in a portion of the bottom wall 141a, the portion projecting outwardly of the edge of the bottom wall 13a of the motor housing 13.

The electric compressor 10 includes an inverter circuit 30 that drives the electric motor 17. The inverter circuit 30 is mounted on a circuit board 31. The inverter circuit 30 is accommodated in the inverter accommodation chamber 14c. Thus, the inverter circuit 30 is accommodated in the inverter case 14. The compression part 16, the electric motor 17, and the inverter circuit 30 are arranged in this order in the axial direction of the rotary shaft 15.

Figure 2:
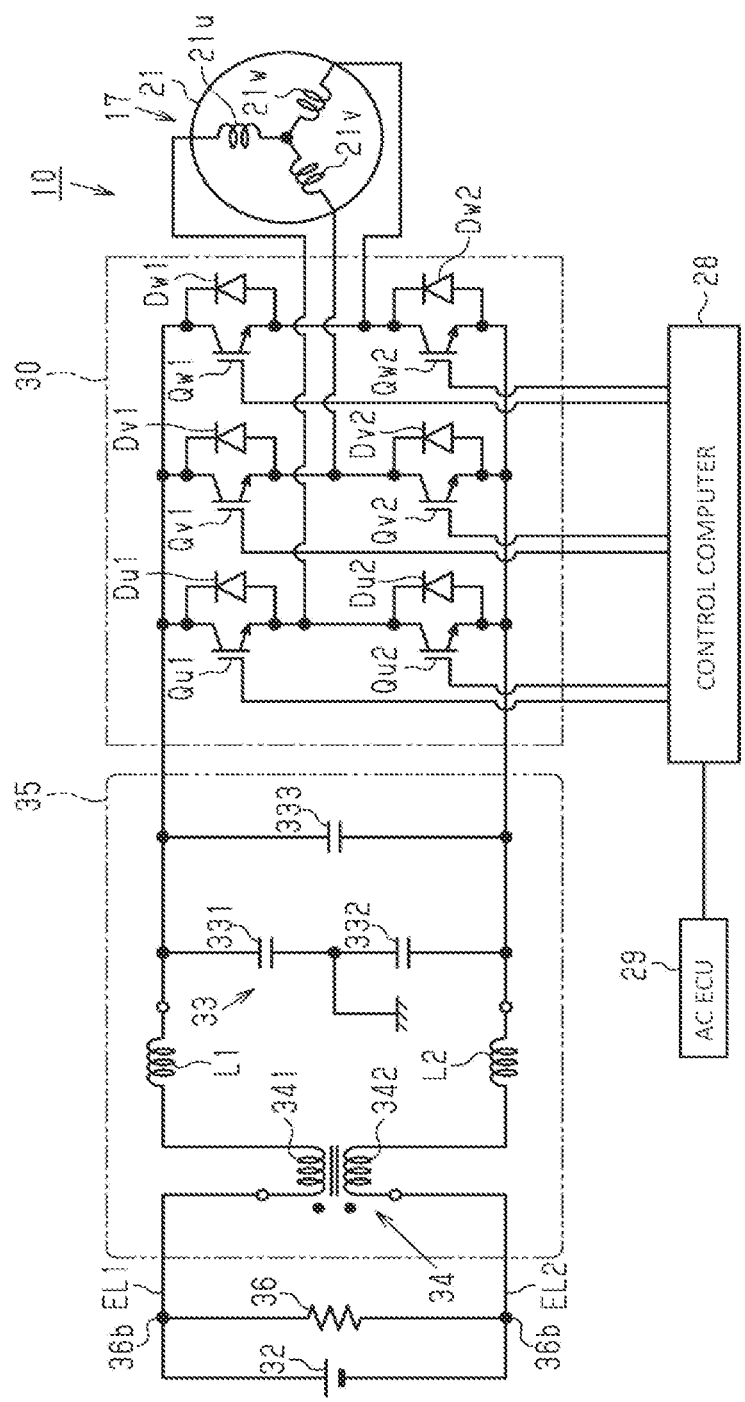
FIG. 2 is a circuit diagram of the electric compressor, illustrating its electric configuration.

As illustrated in FIG. 2, a motor coil 21 has a three phase configuration including a u-phase coil 21u, a v-phase coil 21v, and a w-phase coil 21w. In the present embodiment, the u-phase coil 21u, the v-phase coil 21v, and the w-phase coil 21w are star-connected.

The inverter circuit 30 includes a plurality of switching elements Qu1, Qu2, Qv1, Qv2, Qw1, Qw2. A switching operation of the plurality of switching elements Qu1, Qu2, Qv1, Qv2, Qw1, Qw2 is executed to drive the electric motor 17. The plurality of switching elements Qu1, Qu2, Qv1, Qv2, Qw1, Qw2 is provided by an IGBT (power switching element). The switching elements Qu1, Qu2, Qv1, Qv2, Qw1, Qw2 are connected to diodes Du1, Du2, Dv1, Dv2, Dw1, Dw2, respectively. The diodes Du1, Du2, Dv1. Dv2, Dw1, Dw2 are connected in parallel to the switching elements Qu1, Qu2, Qv1, Qv2. Qw1, Qw2.

Collectors of the switching elements Qu1, Qv1, Qw1 are electrically connected to a positive terminal of a direct electric power source 32 via a first connection line EL1 Emitters of the switching elements Qu2, Qv2, Qw2 are electrically connected to a negative terminal of the direct electric power source 32 via a second connection line EL2. Emitters of the switching elements Qu1,Qv1, Qw1 are connected to the collectors of the switching elements Qu2, Qv2, Qw2 in series, respectively, at their respective intermediate points from which the emitter of the switching element Qu1 and the collector of the switching element Qu2 are connected to the u-phase coil 21u, the emitter of the switching element Qv1 and the collector of the switching element Qv2 are connected to the v-phase coil 21v, and the emitter of the switching element Qw1 and the collector of the switching element Qw2 are connected to the w-phase coil 21w.

A control computer 28 is configured to control voltage driving the electric motor 17 by way of pulse width modulation. Specifically, the control computer 28 generates PWM signals with a high-frequency triangular waveform signal called a carrier signal and a voltage instruction signal for instructing the voltage. The control computer 28 controls a switching operation (ON/OFF control) of each of the switching elements Qu1, Qu2, Qv1, Qv2, Qw1, Qw2 by using the PWM signals generated thereby. Thus, the direct current voltage from the direct electric power source 32 is converted to the alternating current voltage. The operation of the electric motor 17 is controlled with the alternating current voltage applied to the electric motor 17 as the driving voltage.

The control computer 28 variably controls a duty ratio of the switching operation of each of the switching elements Qu1, Qu2, Qv1, Qv2, Qw1, Qw2 by controlling the PWM signals. Accordingly, the number of rotation of the electric motor 17 is controlled. The control computer 28 is electrically connected to an air-conditioner ECU 29, and rotates the electric motor 17, upon receiving information related to a target number of rotations for the electric motor 17 from the air-conditioner ECU 29, according to the received information.

The electric compressor 10 includes a capacitor 33 and a coil 34. The capacitor 33 is disposed on an input side of an inverter circuit 30 and connected in parallel to the direct electric power source 32. The capacitor 33 includes a first bypass capacitor 331, a second bypass capacitor 332, and a smoothing capacitor 333. One end of the first bypass capacitor 331 is electrically connected to the first connection line EL1 The other end of the first bypass capacitor 331 is electrically connected to one end of the second bypass capacitor 332. Thus, the first bypass capacitor 331 and the second bypass capacitor 332 are connected in series. The other end of the second bypass capacitor 332 is electrically connected to the second connection line EL2. An intermediate point between the other end of the first bypass capacitor 331 and the one end of the second bypass capacitor 332 is grounded, for example, to a body of a vehicle.

One end of the smoothing capacitor 333 is electrically connected to the first connection line EL1. The other end of the smoothing capacitor 333 is electrically connected to the second connection line EL2. The first bypass capacitor 331 and the second bypass capacitor 332 are connected in parallel to the smoothing capacitor 333. The smoothing capacitor 333 is disposed closer to the switching elements Qu1, Qu2, Qv1, Qv2, Qw1, Qw2 than the first bypass capacitor 331 and the second bypass capacitor 332 are.

The coil 34 is a common mode choke coil. The coil 34 includes a first winding 341 provided on the first connection line EL1, and a second winding 342 provided on the second connection line EL2. The coil 34 includes imaginary normal mode coils L1, L2 in addition to the first winding 341 and the second winding 342. The imaginary normal mode coils L1, L2 each have a normal mode inductance component due to the magnetic flux leakage from the coil 34. Thus, the coil 34 of the present embodiment includes the first winding 341, the second winding 342, and the imaginary normal mode coils L1, L2 in terms of equivalent circuits. The first winding 341 is connected to the imaginary normal mode coil L1 in series, and the second winding 342 is connected to the imaginary normal mode coil L2 in series.

The coil 34, the first bypass capacitor 331, the second bypass capacitor 332, and the smoothing capacitor 333 are configured to reduce a common mode noise. The common mode noise means a noise, an electric current of which flows through the first connection line EL1 and the second connection line EL2 in the same direction. The common mode noise is generated, for example, when the electric compressor 10 and the direct electric power source 32 are electrically connected through a path other than the first connection line EL1 and the second connection line EL2, e.g. a vehicle body. Thus, the coil 34, the first bypass capacitor 331, the second bypass capacitor 332, and the commutating capacitor 333 form a filter element 35 (filter circuit). Thus, the filter element 35 includes the capacitor 33.

The electric compressor 10 includes a resistor 36 electrically connected to the capacitor 33. The resistor 36 is connected to the capacitor 33 in parallel. The resistor 36 is a discharging resistor configured to discharge electric charge accumulated in the capacitor 33, for example, when an electric power line such as the first connection line EL1 and the second connection line EL2 is broken. One lead portion 36b forming one end of the resistor 36 is electrically connected to the first connection line EL1 between the positive terminal of the direct electric power source 32 and the coil 34. Another lead portion 36b forming the other end of the resistor 36 is electrically connected to the second connection line EL2 between the negative terminal of the direct electric power source 32 and the other end of the capacitor 33.

Figure 3:
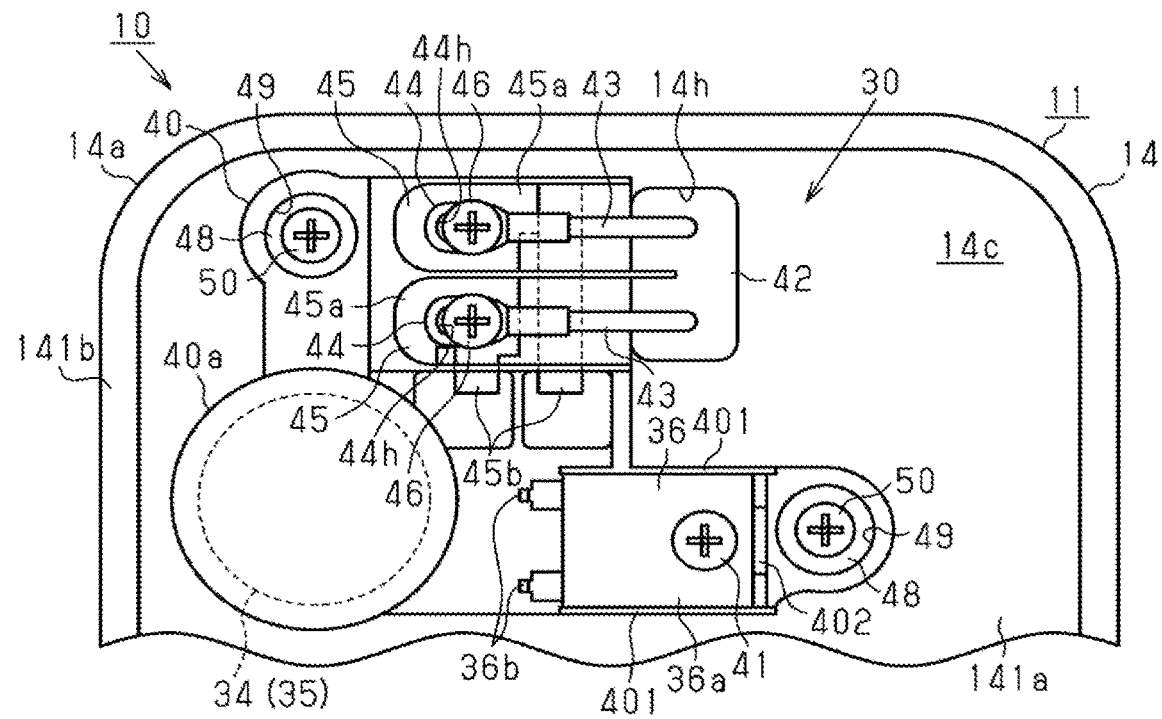
FIG. 3 is a plan view illustrating a part of an inverter accommodation chamber.

As illustrated in FIG. 3, the electric compressor 10 includes a holder 40 made of a resin that is configured to hold the filter element 35. The holder 40 has a plate shape. The holder 40 of the present embodiment holds the coil 34. The holder 40 is accommodated in the inverter accommodation chamber 14c. The resistor 36 is held by the holder 40 with a bolt 41. Thus, the resistor 36 is accommodated in the inverter accommodation chamber 14c. The inverter accommodation chamber 14c accommodates the inverter circuit 30, the holder 40, and the resistor 36. The housing 11 includes the inverter circuit 30, the holder 40, and the inverter accommodation chamber 14c that accommodates the resistor 36. The capacitor 33 is accommodated in the inverter accommodation chamber 14c in a state where the capacitor 33 is held by a holder (not illustrated), which is a separate part form the holder 40. The coil 34 and the capacitor 33 are mounted on the circuit board 31. Thus, the filter element 35 is mounted on the circuit board 31.

A connector connecting portion 42 to which the direct electric power source 32 is connected is mounted to the connector insertion hole 14h. The connector connecting portion 42 is provided with two wires 43. Each of the wires 43 is drawn out from the connector connecting portion 42, and is disposed in the inverter accommodation chamber 14c. Ends of the wires 43 opposite from the connector connecting portion 42 are provided with metal connecting terminals 44, respectively. Each of the connecting terminals 44 has an insertion hole 44h.

Figure 4:
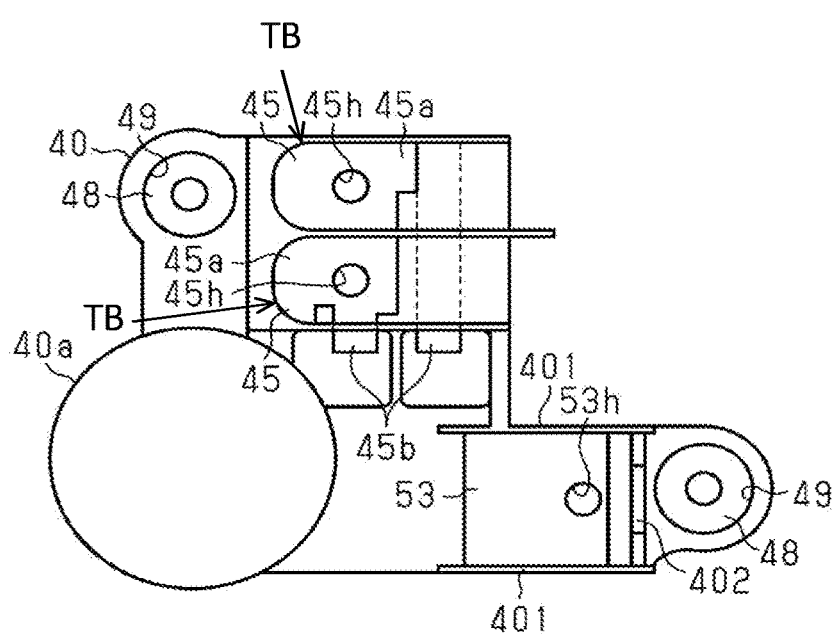
FIG. 4 is a plan view of a holder.

As illustrated in FIG. 4, the holder 40 has two bus bars 45. The bus bars 45 are formed integrally with the holder 40. Each of the bus bars 45 has a first connecting portion 45a having a plate shape and electrically connected to its associated connecting terminal 44, and a second connecting portion 45b extending from the first connecting portion 45a and electrically connected to the circuit board 31. The bus bars 45 are mounted to the holder 40 so that the thickness direction of the first connecting portion 45a coincides with the thickness direction of the holder 40. A bus bar threaded hole 45h is formed in the first connecting portion 45a of each of the bus bars 45. Each of the bus bars 45 and a part of the holder 40 form a terminal block TB to which its associated connecting terminal 44 is connected.

As illustrated in FIG. 3, a connecting terminal bolt 46 inserted through the insertion hole 44h of each of the connecting terminals 44 is screwed into the bus bar threaded hole 45h of the first connecting portion 45a of each of the bus bars 45, so that each of the connecting terminals 44 is electrically connected to each of the bus bars 45. Accordingly, the direct electric power source 32 and the circuit board 31 are electrically connected through the connector connecting portion 42, the wires 43, the connecting terminals 44, and the bus bars 45. The connecting terminals 44 are used for electrically connecting the direct electric power source 32 and the circuit board 31. The holder 40 and the terminal block TB on which the connecting terminals 44 are placed are integrated.

Figure 5:
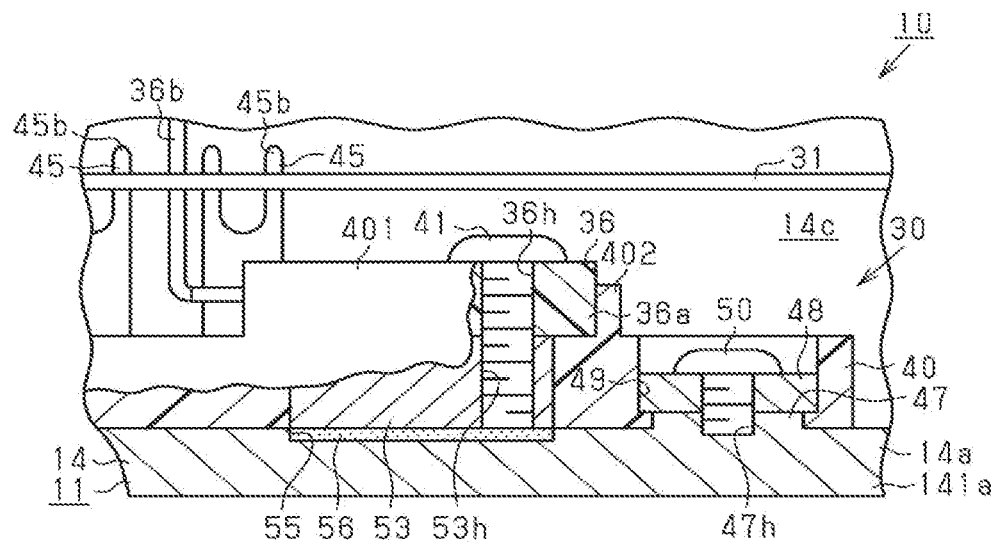
FIG. 5 is a cross-sectional view, illustrating a part of the electric compressor.
Figure 6:
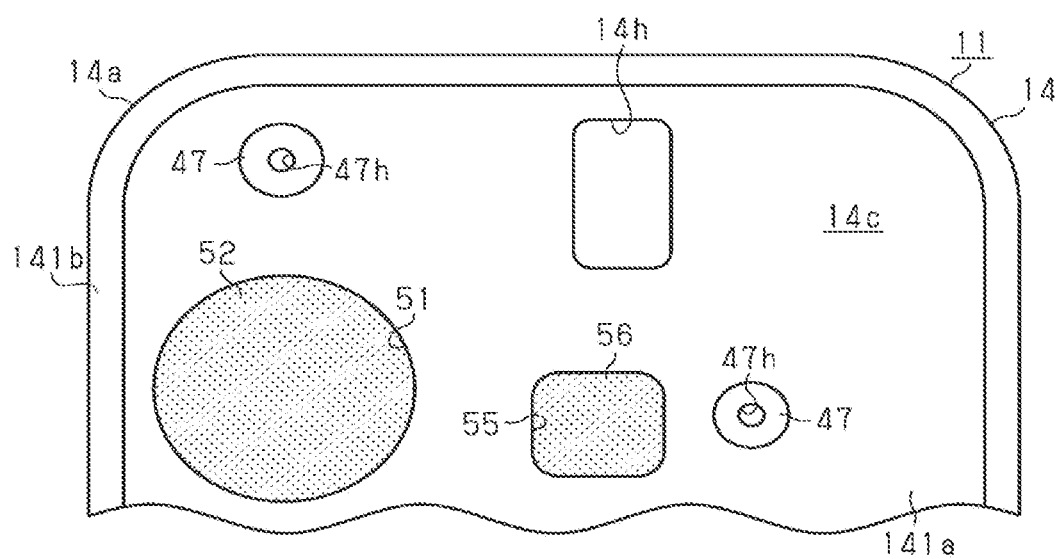
FIG. 6 is a plan view, illustrating a part of an inverter case.

As illustrated in FIGS. 5 and 6, two bosses 47 having a cylindrical shape are formed protruding from the inner surface of the bottom wall 141a of the case body 14a. A boss threaded hole 47h is formed in each of the bosses 47. The holder 40 includes two washers 48. The washers 48 are formed integrally with the holder 40. The holder 40 has washer holding holes 49 to hold the washers 48. The axial direction of each of the washer holding holes 49 coincides with the thickness direction of the holder 40. Each of the washers 48 is held by the holder 40 with the washers 48 accommodated in each of the washer holding holes 49. Fixing bolts 50 inserted through their associated washers 48 are screwed into the boss threaded holes 47h of the bosses 47, so that the holder 40 is fixed to the inner surface of the bottom wall 141a of the case body 14a. Thus, the holder 40 is fixed to the housing 11.

As illustrated in FIGS. 3 and 4, the holder 40 has a coil accommodation wall 40a having a tubular shape. The axial direction of the of the coil accommodation wall 40a coincides with the thickness direction of the holder 40. The coil 34 is held by the holder 40 with the coil 34 accommodated in the coil accommodation wall 40a. As illustrated in FIG. 6, a coil holding recess 51 is formed in the inner surface of the bottom wall 141a of the case body 14a. A coil potting resin 52 having insulating property is applied to the coil holding recess 51. The coil 34 is thermally bonded to the case body 14a via the coil potting resin 52 with the coil 34 held by the coil accommodation wall 40a.

As illustrated in FIG. 3, the resistor 36 has a mold portion 36a having a rectangular plate shape in which a resistive unit (not illustrated) is provided, a pair of lead portions 36b projecting from one end surface of the mold portion 36a on one end in the longitudinal direction thereof. As illustrated in FIG. 5, the resistor 36 is mounted on the circuit board 31 with the pair of lead portions 36b electrically connected to the circuit board 31. A through hole 36h is formed in the mold portion 36a. The through hole 36h extends through the mold portion 36a in the thickness direction thereof.

As illustrated in FIGS. 3 and 4, the holder 40 includes a pair of first side walls 401 having a thin plate shape, extending along side surfaces of the mold portion 36a on opposite ends in the short side direction thereof. The holder 40 further includes a second side wall 402 having a thin plate shape, extending along the other end surface of the mold portion 36a on the other end in the longitudinal direction thereof. The paired first side walls 401 extend in parallel to each other. The second side wall 402 extends in a direction perpendicular to an extending direction of the paired first side walls 401 in plan view of the holder 40. A part of the holder 40 is interposed between the lead portions 36b and the bottom wall 141a of the case body 14a. Thus, the holder 40 is interposed between the lead portions 36b and the housing 11.

As illustrated in FIGS. 4 and 5, the holder 40 includes a metal plate 53 The metal plate 53 is disposed between the paired first side walls 401 in the plan view of the holder 40. Opposite end surfaces of the metal plate 53 in the thickness direction thereof face the opposite surfaces of the holder 40 in the thickness direction thereof. The opposite end surfaces of the metal plate 53 in the thickness direction thereof are positioned on the same surface with the opposite surfaces of the holder 40 in the thickness direction thereof.

The metal plate 53 has an internally threaded hole 53h. The internally threaded hole 53h extends through the metal plate 53 in the thickness direction thereof. The resistor 36 is fixed to the holder 40 with the metal plate 53 interposed therebetween with the bolt 41 inserted through the through hole 36h and screwed in the internally threaded hole 53h. The resistor 36 is fastened to the metal plate 53 by the bolt 41. Thus, the resistor 36 is held by the holder 40 with the metal plate 53 interposed therebetween with the bolt 41 screwed into the internally threaded hole 53h. The mold portion 36a of the resistor 36 is in contact with the metal plate 53.

As illustrated in FIGS. 5 and 6, a metal plate recess 55 is formed in the inner surface of the bottom wall 141a of the case body 14a. A metal plate potting resin 56 having insulating property is applied to the metal plate recess 55. The metal plate 53 is in close contact with the metal plate potting resin 56. The metal plate 53 is thermally bonded to the case body 14a with the metal plate potting resin 56 interposed therebetween. Thus, the metal plate potting resin 56 is an insulating heat transfer member interposed between the metal plate 53 and the housing 11. The resistor 36 is thermally bonded to the case body 14a with the metal plate 53 and the metal plate potting resin 56 interposed therebetween.

The following will describe the operation of the present embodiment.

The resistor 36 is held by the holder 40 with the metal plate 53 interposed therebetween. The creepage distance between the resistor 36 and the housing 11 is thus secured by the holder 40. Furthermore, since the metal plate potting resin 56 having insulating property is interposed between the metal plate 53 and the case body 14a, heat generated by the resistor 36 is efficiently dissipated to the case body 14a through the metal plate 53 and the metal plate potting resin 56. Thus, the resistor 36 is cooled efficiently, and hence the durability of the resistor 36 is increased.

The present embodiment offers the following effects.

(1) The holder 40 includes the metal plate 53 in which the internally threaded hole 53h is formed. The resistor 36 is held by the holder 40 with the metal plate 53 interposed therebetween with the bolt 41 screwed into the internally threaded hole 53h Thus, the resistor 36 is fastened to the metal plate 53 with the bolt 41. The holder 40 is fixed to the bottom wall 141a of the case body 14a. The metal plate potting resin 56 having insulating property is interposed between the metal plate 53 and the housing 11. According to this configuration, the resistor 36 may be held by the holder 40 fixed to the housing 11 with the bolt 41 screwed into the internally threaded hole 53h of the metal plate 53, so that the resistor 36 need not be directly mounted to the inner surface of the bottom wall 141a of the case body 14a in the inverter accommodation chamber 14c. In addition, the holder 40 is interposed between the lead portions 36b and the bottom wall 141a of the case body 14a. Thus, the creepage distance between the lead portions 36b of the resistor 36 and the housing 11 may be secured by the holder 40 that is an existing component necessary to hold the filter element 35. Therefore, an insulation member to secure the creepage distance between the lead portions 36b of the resistor 36 and the housing 11 need not be provided separately from the holder 40 in order to secure the insulation between the lead portions 36b of the resistor 36 and the housing 11. As a result, the size of the electric compressor 10 does not become large. Furthermore, since the resistor 36 is held by the holder 40 with the metal plate 53 interposed therebetween and the metal plate potting resin 56 having insulating property is interposed between the metal plate 53 and the housing 11, heat generated from the resistor 36 is efficiently dissipated to the case body 14a through the metal plate 53 and the metal plate potting resin 56. Accordingly, heat generated from the resistor 36 may be efficiently dissipated without increasing the size of the electric compressor 10.

(2) The holder 40 and the terminal block TB on which the connecting terminals 44 for electrically connecting the direct electric power source 32 and the circuit board 31 are disposed are integrated. According to this configuration, the holder 40, which is an existing component necessary to hold the filter element 35, may function as the terminal block TB on which the connecting terminals 44 for electrically connecting the direct electric power source 32 and the circuit board 31 are disposed. As compared with the configuration in which the holder 40 and the terminal block are provided separately, the number of parts may be reduced and hence the configuration of the electric compressor 10 may be simplified.

(3) The holder 40 includes the pair of first side walls 401 each having a thin plate shape, extending along the side surfaces of the mold portion 36a on opposite ends in the short side direction thereof, and the second side wall 402 having a thin plate shape, extending along the other end surface of the mold portion 36a on the other end in the longitudinal direction thereof. According to this configuration, the creepage distance between the resistor 36 and the housing 11 may be increased with the paired first side walls 401 and the second side wall 402, as compared with a case where the holder 40 is not provided with the paired first side walls 401 and the second side wall 402. This configuration permits securing the insulation between the resistor 36 and the housing 11.

It is noted that the above-described embodiment may be modified in various manners, as exemplified below. The above-described embodiment and its modifications may be combined within the scope consistent with the present disclosure.

In the embodiment, the terminal block on which the connecting terminals 44 for electrically connecting the direct electric power source 32 and the circuit board 31 are disposed need not be integrated with the holder 40. In other words, the electric compressor 10 may have a configuration that includes the holder 40 and the terminal block as separate parts.

In the embodiment, an insulating sheet member having an excellent heat transfer performance may be interposed between the metal plate 53 and the housing 11 as a heat transfer member. In this case, the metal plate potting resin 56 need not be applied to the metal plate recess 55.

In the embodiment, the capacitor 33 may be held by the holder 40. In other words, a type of a part held by the holder 40 is not limited as long as the holder 40 holds a part constituting the filter element 35.

In the embodiment, the holder 40 need not necessarily have the configuration having the paired first side walls 401 and the second side wall 402.

For example, the holder 40 need not include the second side wall 402.

For example, the holder 40 need not include the paired first side walls 401.

For example, the holder 40 need not include one of the paired first side walls 401.

In the embodiment, the shape of the resistor 36 is not limited. For example, the mold portion 36a of the resistor 36 need not have a rectangular plate shape, but may have a square plate shape.

The resistor 36 may be provided by, for example, a damping resistor. In short, the resistor 36 may be of any type as long as the resistor 36 is electrically connected to the capacitor 33, and for example, the resistor 36 may be connected to the capacitor 33 in series. Therefore, the use of the resistor 36 is not specifically limited to the above-described embodiment.

In the embodiment, the coil 34 may be provided by a normal mode choke coil.

In the embodiment, the electric compressor 10 may have the configuration in which a bottomed tubular cover member is mounted to the bottom wall 13a of the motor housing 13, and the outer surface of the bottom wall 13a of the motor housing 13 and the inner surface of the cover member forms the inverter accommodation chamber 14c accommodating the inverter circuit 30. In this case, the cover member is a part of the housing 11.

In the embodiment, the electric compressor 10 may have a configuration in which the inverter circuit 30 is disposed outward of the motor housing 13 in the radial direction of the rotary shaft 15. In other words, the compression part 16, the electric motor 17, and the inverter circuit 30 need not necessarily be arranged in this order in the axial direction of the rotary shaft 15.

In the embodiment, the compression part 16 is not limited to the scroll type, but may be a piston type or a vane type compression part.

Although the electric compressor 10 forms a part of the vehicle air-conditioner 23 in the embodiment, it is not limited to this. For example, the electric compressor 10 may be mounted to a fuel cell vehicle and be configured to compress air as fluid supplied to the fuel cell battery by the compression part 16.

What is claimed is:

1. An electric compressor comprising:
a rotary shaft;
a compression part configured to compress fluid with a rotation of the rotary shaft;
an electric motor configured to rotate the rotary shaft;
an inverter circuit configured to drive the electric motor;
a filter element disposed on an input side of the inverter circuit, the filter element including a capacitor connected in parallel to a direct current power source;
a holder made of a resin and holding the filter element;
a resistor having a lead portion electrically connected to the capacitor; and
a housing made of a metal and having an inverter accommodation chamber in which the inverter circuit, the holder, and the resistor are accommodated, wherein
the holder includes a metal plate having an internally threaded screw hole;
the resistor is held by the holder with the metal plate interposed between the resistor and the holder with a bolt screwed into the internally threaded screw hole of the metal plate, the resistor having the lead portion is fastened to the metal plate with the bolt,
the holder is fixed to the housing,
the holder is interposed between the lead portion of the resistor and the housing,
an insulating heat transfer member is interposed between the metal plate of the holder and the housing,
the metal plate has first and second opposite end surfaces in a thickness direction of the metal plate,
the first opposite end surface of the metal plate faces the housing, and
the resistor is screwed to the second opposite surface of the metal plate.

2. The electric compressor according to claim 1, further comprising:
a circuit board on which the filter element and the resistor are mounted; and
a connecting terminal electrically connecting the direct current power source and the circuit board, wherein
the holder and a terminal block on which the connecting terminal is disposed are integrated.

* * * * *